| United States Patent [19] | [11] Patent Number: 4,956,323 |
| Hefner | [45] Date of Patent: Sep. 11, 1990 |

[54] CATALYSTS PREPARED FROM TETRAKIS(DIALKYLAMIDE OR DIARYLAMIDE) DERIVATIVES OF TITANIUM AND POLYMERIZATION OF OLEFINS THEREWITH

[75] Inventor: John G. Hefner, Lake Jackson, Tex.

[73] Assignee: The Dow Chemical Company, Midland, Mich.

[21] Appl. No.: 404,724

[22] Filed: Sep. 8, 1989

Related U.S. Application Data

[60] Division of Ser. No. 295,855, Jan. 11, 1989, Pat. No. 4,892,914, which is a continuation-in-part of Ser. No. 236,691, Aug. 25, 1988, abandoned, which is a continuation-in-part of Ser. No. 126,331, Nov. 30, 1987, abandoned.

[51] Int. Cl.$^5$ ................................................ C08F 4/64

[52] U.S. Cl. ................................. 502/113; 502/103; 502/134

[58] Field of Search ...................... 502/103, 113, 134

[56] References Cited

U.S. PATENT DOCUMENTS 4,325,837  4/1982  Capshew et al. ............... 502/134 X
4,363,746 12/1982  Capshew ......................... 502/113 X

*Primary Examiner*—Patrick P. Garvin

[57] ABSTRACT

Ziegler-Natta catalysts for polymerizing α-olefins are prepared by the addition of tetrakis(dialkylaminde or diarylamide) derivatives of titanium, and a metal-containing reducing agent such as ethyl aluminum dichloride to a suitable support material such as magnesium chloride. Olefins are polymerized in the presence of these supported catalysts and an aluminum containing cocatalyst or activator such as triethylaluminum.

8 Claims, No Drawings

CATALYSTS PREPARED FROM TETRAKIS(DIALKYLAMIDE OR DIARYLAMIDE) DERIVATIVES OF TITANIUM AND POLYMERIZATION OF OLEFINS THEREWITH

This application is a division of application Ser. No. 07/295,855 filed Jan. 11, 1989 and now U.S. Pat. No. 4,892,914 which is a continuation-in-part of application No. 07/236,691 filed Aug. 25, 1988, now abandoned which is a continuation-in-part application of application Ser. No. 07/126,331 filed Nov. 30, 1987, now abandoned, all of which are incorporated by reference in their entirety.

FIELD OF THE INVENTION

The present invention pertains to supported catalysts containing tetrakis (dialkylamide or diarylamide) derivatives of titanium, zirconium and hafnium useful for polymerizing olefins.

BACKGROUND OF THE INVENTION

The use of tetrakis(dialkylamide or diarylamide) derivatives of titanium in the Ziegler-Natta catalysis of α-olefins has been described by Firestone Tire & Rubber Co. in British Patent No. 969,074, published Sept. 9, 1964. These polymerizations, however, have been conducted at low temperatures, i.e. at temperatures up to about 150° C.

It would be desirable to have catalysts which are operable at higher temperatures so as to be useful in the solution polymerization of α-olefins. The present invention provides catalyst compositions which are useful for the polymerization of olefins at both low and high temperatures under either slurry or solution polymerization conditions and also provides catalyst compositions for producing polymers of narrow or broad molecular weight distributions, depending on the compositions employed. One particular advantage of the catalysts of the present invention over those of the prior art is the production of high surface area supported catalysts without the use of energy intensive ball milling and/or grinding of the supported compositions. Another advantage is a reduction in the number of additives required to produce efficient catalysts as required in the prior art employing tetrakis(dimethylamino)silane solutions in catalyst compositions. Another advantage is the preparation of high efficiency catalyst compositions which eliminates the need to remove catalyst residues from the resin products.

SUMMARY OF THE INVENTION

The present invention pertains to a supported catalyst which comprises the product resulting from mixing in a suitable inert diluent or solvent
(A) an inorganic support;
(B) a metal-containing reducing agent:
(C) a transition metal compound selected from the group consisting of a titanium tetrakis(dialkylamide) or titanium tetrakis(diarylamide) or a combination thereof: wherein in the preparation of the catalyst, all of components (A) and (B) are added prior to the addition of component (C) and the components are employed in quantities which provide an atomic ratio of Ms:Tm suitably of from about 2:1 to about 160:1, more suitably from about 8:1 to about 80:1, most suitably from about 11:1 to about 40:1; an atomic ratio of Mr:Tm suitably of from about 1:1 to about 64:1, more suitably from about 2:1 to about 32:1, most suitably from about 4:1 to about 16:1; and wherein Ms represents the metal atoms in the support material, Mr represents the metal atoms in the reducing agent and Tm represents the sum of the transition metal atoms in the transition metal component.

Another aspect of the present invention pertains to a process for polymerizing one or more α-olefins, or a mixture of one or more α-olefins and one or more polymerizable ethylenically unsaturated monomers which comprises conducting the polymerization under solution polymerization conditions in the presence of
(I) a supported catalyst which comprises the product resulting from mixing in a suitable inert diluent or solvent
  (A) an inorganic support:
  (B) a metal-containing reducing agent; and
  (C) a transition metal compound selected from the group consisting of a titanium tetrakis(dialkylamide) or titanium tetrakis(diarylamide) or a combination thereof; wherein in the preparation of the catalyst, all of components (A) and (B) are added prior to the addition of component (C): and
(II) a cocatalyst or activator compound;
wherein the components are employed in quantities which provide an atomic ratio of Ms:Tm suitably of from about 2:1 to about 160:1, more suitably from about 4:1 to about 80:1, most suitably from about 8:1 to about 40:1; an atomic ratio of Mc:Tm suitably of from about 1:1 to about 64:1, more suitably from about 2:1 to about 32:1, most suitably from about 4:1 to about 16:1; an atomic ratio of Mr:Tm suitably of from about 1:1 to about 64:1, more suitably from about 2:1 to about 32:1, most suitably from about 4:1 to about 16:1: and wherein Ms represents the metal atoms in the support material, Mc represents the metal atoms in the cocatalyst or activator material, Mr represents the metal atoms in the reducing agent and Tm represents the sum of the transition metal atoms in the transition metal component.

DETAILED DESCRIPTION OF THE INVENTION

The transition metal tetrakis(dialkyl- or diarylamides) are commercially available, or they can be prepared by reacting a dialkyl- or diarylamine such as those wherein the alkyl groups have from about 1 to 4 carbon atoms with a lithium alkyl compound such as n-butyllithium in a suitable solvent at a temperature from about −100° C. to reflux with the most suitable method being reacting the secondary amine with the lithium alkyl at or below −20° C. followed by the addition of a transition metal halide and refluxing the mixture for 0.1 to 48 hours with the most suitable reflux time being from about 1 to about 2 hours. Suitable solvents include, for example, aromatic hydrocarbons, ethers, cyclic ethers, aliphatic hydrocarbons, industrial solvents such as paraffinics, kerosenes, and the like. Particularly suitable solvents include, for example, diethyl ether, hexane, heptane, octane, toluene and tetrahydrofuran, combinations thereof and the like.

This method is fully described by Bradley, D. C. and Thomas, I. M., *J. Chem. Soc.* (1960), 3857 and Chandra, D. and Lappert, M. F., *J. Chem. Soc.* (A), (1968), 1940 which are incorporated herein by reference in their entirety.

Suitable titanium tetrakis(dialkylamides or diarylamides) which can be employed herein, include, for example, those represented by the formula $Ti(NR_2)_4$ wherein each R is independently an alkyl group having from 1 to about 4 carbon atoms, a benzyl group, a phenyl group, an alkyl benzyl group wherein each alkyl group has from 1 to about 4 carbon atoms, most suitably from 1 to about 3 carbon atoms, a phenyl group having 6 carbon atoms, or an alkyl substituted aryl group having from 7 to about 20 carbon atoms, most suitably from 7 to 11 carbon atoms wherein the alkyl groups have from 1 to about 14 carbon atoms, most suitably from 1 to about 5 carbon atoms. Particularly suitable titanium tetrakis(dialkylamides or diarylamides) include titanium tetrakis(dimethylamide), titanium tetrakis(dibenzylamide), titanium tetrakis(diethylamide), titanium tetrakis(diphenylamide), titanium tetrakis(di-n-propylamide), titanium tetrakis(di-i-propylamide), titanium tetrakis(di-i-butylamide), titanium bis(diethylamide) bis(dimethylamide), titanium (di-i-propylamide) tris(dimethylamide) and any other combinations of alkyl- or arylamide groups limited only by the steric properties of the complex.

In addition to the titanium tetrakis(dialkylamides or diarylamides) which are employed herein as the transition metal component of the catalyst, the transition metal component of the catalyst may also contain zirconium and/or hafnium tetrakis(dialkylamides or diarylamides). When these zirconium and/or hafnium components are employed, they are employed in quantities which provide an atomic ratio of (Zr+Hf):(Ti+Zr+Hf) of suitably from about >0:1 to about 0.9:1, more suitably from about >0:1 to about 0.8:1, more suitably from about >0:1 to about 0.7:1.

The hafnium and zirconium compounds are not employed alone because the efficiency of the resultant catalyst is too low to be practically feasible. When the catalyst contains either hafnium or zirconium tetrakis(dialkylamides or diarylamides) in addition to the titanium tetrakis(dialkylamides or diarylamides), the melt index, molecular weight distribution, and density of the resultant polymer is altered. Also, the hydrogen reactivity of the catalyst is altered. These altered polymer properties are considered to be altered when compared to the properties obtained when the tetrakis(dialkyl- or diarylamides) are employed alone i.e. without any zirconium or hafnium compounds being present.

Suitable zirconium and hafnium tetrakis(dialkylamides or diarylamides) which can be employed herein, include, for example, those represented by the following formula $Tm(NR_2)_4$ wherein Tm is zirconium or hafnium and $R_2$ is independently an alkyl group, a phenyl group, an alkyl benzyl group wherein each alkyl group has from 1 to about 4 carbon atoms, most suitably from 1 to about 3 carbon atoms, a phenyl group having 6 carbon atoms or an alkyl substituted aryl group having from 7 to about 20 carbon atoms, most suitably from 7 to about 11 carbon atoms, wherein the alkyl groups have from 1 to about 14 carbon atoms, most suitably from 1 to about 5 carbon atoms. Particularly suitable Tm tetrakis(dialkylamides or diarylamides), include, for example, zirconium tetrakis(dimethylamide), zirconium tetrakis(diethylamide), zirconium tetrakis(diphenylamide), zirconium tetrakis(di-n-propylamide), zirconium tetrakis(di-i-propylamide), hafnium tetrakis(dimethylamide), hafnium tetrakis(diethylamide), hafnium tetrakis(diphenylamide), hafnium tetrakis(di-n-propylamide), hafnium tetrakis(di-i-propylamide), and any other combinations of alkyl- or arylamide groups limited only by the steric demands of the attached groups.

Suitable support materials which can be employed herein include, for example, the anhydrous salts of magnesium chloride, magnesium bromide, manganese dichloride, manganese dibromide, alumina, aluminum phosphates, silica, titanium dioxide, combinations thereof and the like.

Suitable metal containing reducing agents which can be employed herein include, for example, those represented by the formula $Al(R')_{3-m}X_m$ wherein each $R'$ is independently hydrogen or a hydrocarbyl group having from 1 to about 20, most suitably from 2 to about 5 carbon atoms; X is a halogen, preferably chlorine; and m has a value from 1 to 2. The term hydrocarbyl as employed herein includes, alkyl, cycloalkyl, aryl, aralkyl, alkaryl, alkenyl and the like. Particularly suitable reducing halides which can be employed herein as the reducing agent include, for example, ethylaluminum dichloride, diethylaluminum chloride, ethylaluminum sesquichloride, ethylboron dichloride, diethylboron chloride, diethylaluminum bromide, ethylaluminum dibromide, with ethylaluminum dichloride being most preferred. Alternatively, a metal halide such as aluminum trichloride can be employed in combination with an alkyl aluminum halide or a trialkyl aluminum compound. Other reducing agents include magnesium alkyls, lithium alkyls, alkali metals, metal hydrides, zinc alkyls and aluminum alkyls. Suitable such reducing agents include lithium aluminum hydride, potassium hydride, methyllithium, butyllithium, sodium hydride, triisobutyl aluminum, trimethyl aluminum, dimethyl magnesium, dimethyl zinc, combinations thereof and the like.

Suitable cocatalyst or activators which can be employed herein include, for example, those aluminum, boron, zinc or magnesium compounds represented by the formulas $Al(R')_{3-a}X_a$, $B(R')_{3-a}X_a$, $Mg(R')_2$, $Zn(R')_2$ or combinations thereof wherein each $R'$ is independently hydrogen or a hydrocarbyl group having from 1 to about 20 carbon atoms, most suitably from 2 to 5 carbon atoms; X is a halogen, preferably chlorine; and a has a value from zero to 1. The term hydrocarbyl as employed herein includes, alkyl, cycloalkyl, aryl, aralkyl, alkaryl, alkenyl and the like. Particularly suitable cocatalysts or activators which can be employed include, for example, dibutylmagnesium, trimethylboron, triethylboron, diethyl zinc, diethylaluminum chloride, trimethylaluminum, tri-i-propylaluminum, tri-i-butylaluminum, most preferred is triethylaluminum, combinations thereof and the like.

When it is desired that the transition metal component of the catalyst contain either or both of the aforementioned zirconium or hafnium compounds, they can be cosupported on the same support as the titanium compound or they can be independently supported on separate supports and the independently supported and prepared catalysts subsequently blended to provide the desired atomic ratio of zirconium and/or hafnium to total transition metal e.g. Ti+Zr+Hf. The cosupported transition metal compounds or the mixture of independently supported transition metal compounds can then be reduced with the reducing agent. Cosupported mixtures of transition metal compounds can be prepared by adding mixtures of two or more transition metal compounds to a mixture of support material and reducing agent.

In the preparation of the supported transition metal component, the transition metal can be admixed with the support and the reducing agent in either of the following orders of addition; (a) reducing agent followed by the inorganic support followed by the transition metal compound(s) or complex(es) or (b) inorganic support followed by the reducing agent followed by the transition metal compound(s) or complex(es) or (c) the inorganic support and the reducing agent can be added simultaneously prior to the addition of the transition metal compound(s) or complex(es). If desired, additional inert diluent or solvent can be added at any step in the catalyst preparation in order to obtain the desired concentration of the components. The mixture is allowed to age from about 5 minutes to several weeks before admixing with the activator or cocatalyst and employing the mixture in a polymerization process.

The cocatalyst or activator can be admixed with the supported, reduced transition metal catalyst component and the mixture employed immediately in the polymerization process or alternately, the cocatalyst or activator can be added to the prepared catalyst and the resultant mixture aged for up to several days before employing the mixture in the polymerization process depending on the reactivity of the activator or cocatalyst employed. Also, if desired, the supported reduced transition metal component and the cocatalyst or activator can be added to the polymerization reactor separately or in a continuous operation, the supported reduced transition metal component can be piped to the polymerization reactor or zone and the cocatalyst or activator can be injected into the pipe carrying the supported reduced transition metal component at some point prior to the entry of the supported reduced transition metal component into the polymerization reactor or zone so that the two components are mixed prior to entering the polymerization reactor or polymerization zone.

Olefins which are suitably homopolymerized or copolymerized in the practice of this invention are generally the aliphatic α-monoolefins or α-diolefins having from 2 to about 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene, 1,4-hexadiene, mixtures thereof and the like. It is understood that α-olefins may be copolymerized with other α-olefins and/or with other ethylenically unsaturated monomers such as styrene, 4-methylstyrene and similar ethylenically unsaturated monomers which do not destroy conventional Ziegler catalysts. Most benefits are realized in the polymerization of aliphatic α-monoolefins, particularly ethylene with up to 50, especially from about 0.1 to about 40, weight percent of propylene, butene-1, hexene-1, octene-1, 4-methylpentene-1, 1,7-octadiene, 1,4-hexadiene or similar alpha-olefin or diolefin based on total monomer.

The catalysts of the present invention are prepared in the presence of an inert diluent. The concentration of the catalyst components are usually such that when the essential components of the catalyst composition are combined, the resultant catalyst slurry is from about 0.001 to 0.1, most suitably from about 0.01 to 0.04 molar with respect to the transition metal component. Suitable inert diluents which can be employed include, for example, liquified ethane, propane, isobutane, n-butane, n-hexane, the various isomeric hexanes, isooctane, paraffinic mixtures of alkanes having from about 8 to about 12 carbon atoms, cyclohexane, methylcyclohexane, dimethylcyclohexane, dodecane, industrial solvents composed of saturated or aromatic hydrocarbons such as kerosene, naphthas, and the like, especially when free of any olefin compounds and other impurities especially those which contain oxygen, sulfur or any other materials considered to be poisons of Ziegler catalysts. Also included as suitable diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range of from about $-100°$ C. to about 200° C., suitably from about 0° C. to about 100° C. The period of mixing is not considered to be critical as it is found that a sufficient catalyst composition most often occurs within about 1 minute or less of mixing. However, it is preferred to permit the mixture to age after mixing for a period of at least about 1 minute up to an indefinite period of time, more preferably from about 12 hours to about 1 week, most preferably from about 18 hours to about 3 days. In the preparation of the catalytic reaction product, it is not necessary to separate hydrocarbon soluble components from hydrocarbon insoluble components of the reaction product.

In order to achieve full activity of the catalyst, it is critical that the mixture containing inorganic support, reducing agent and transition metal component be aged for at least about 12 hours prior to being combined with the cocatalyst or activator.

In the polymerization process employing the aforementioned catalyst compositions polymerization is effected by adding a catalytic amount of the catalyst composition to a polymerization zone containing α-olefin monomer, or vice versa. The polymerization zone is usually maintained at temperatures in the range of from about 0° C. to about 300° C., preferably at solution polymerization temperatures. Under solution polymerization conditions temperatures of from about 130° C. to about 250° C. are preferred. Residence times of from about a few seconds to several days, preferably 15 seconds to 2 hours can be suitably employed. It is generally desirable to carry out the polymerization in the absence of moisture and oxygen and a catalytic reaction product is generally within the range from about 0.0001 to about 0.1 millimoles in transition metal per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of transition metal. Generally, in the polymerization process, a carrier is employed which can be an inert organic diluent or solvent or which can be excess monomer. In order to realize the full benefit of the high efficiency catalyst of the present invention, care must be taken to avoid oversaturation of the solvent with polymer. If such saturation occurs before the catalyst becomes depleted, full efficiency is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g., from about 5 to 10,000 psig (0.034–68.9 MPa), preferably from about 50 to about 1000, (0.345–6.89 MPa), most preferably from about 100 to about 700 psig (0.689–4.8 MPa). However, polymerization within the scope of the present invention can occur at pressures from atmospheric up to pressures determined by the capabilities of the polymerization equipment, which include pressures up to about 50,000 psig (344.5 MPa). During polymerization it is desirable to stir the polymerization recipe to obtain better temperature control and to maintain uniform polymerization mixtures throughout the polymerization zone.

In order to optimize catalyst yields in the polymerization of ethylene in an inert solvent under solution conditions, it is preferable to maintain an ethylene concentration in the solvent in the range of from about 1 to about 30 weight percent, most advantageously from about 4 to about 20 weight percent. To achieve this, when an excess of ethylene is fed into the system, a portion of the ethylene can be vented. In other processes, it is preferred to conduct the polymerization in an excess of the alpha-olefin being polymerized in order to optimize catalyst yields.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel before, during or after addition of the monomer to the polymerization vessel, but during or before addition of the catalyst.

The monomer or mixtures of monomers is contacted with the catalytic reaction product in any conventional manner, preferably by bringing the catalytic reaction product and monomer together with intimate agitation provided by suitable stirring or other means. Agitation can be continued during polymerization, or in some instances, the mixture can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material suitably from 0° C. to about 300° C., most suitably from about 130° C. to about 250° C. The polymerization can be effected in the batch manner, or in a continuous manner, such as, for example, by passing the reaction mixture through an elongated reaction tube which is contacted externally with suitable "heat exchange" media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst removal steps. In some instances, however, it may be desirable to add a small amount of a catalyst deactivating reagent of the type conventionally employed for deactivating Ziegler catalysts.

The catalyst compositions containing the zirconium and/or hafnium tetrakis(dialkyl- or diarylamides) do not polymerize the α-olefins or α-diolefins with sufficient activity to be employed as the only transition metal source in the catalyst compositions, therefore, they are employed in combination with the titanium tetrakis(dialkylamides or diarylamides) so as to alter parameters, for example, such as melt index ratio of the resin, the density of the resin or the hydrogen reactivity of the catalyst. When the supported titanium tetrakis(dialkylamides or diarylamides) are employed alone as the catalyst, the resultant polymers have moderate melt index ratios of $I_{10}/I_2$ and hydrogen response characteristic of titanium based transition metal catalysts typically employed in the conditions described herein of this invention. When it is desired that the polymer have a higher melt index ratio or different response to hydrogen concentrations in the polymerization reactor, then amounts of the zirconium and/or hafnium tetrakis(dialkyl- or diarylamides) are employed so as to provide the resultant polymers with higher melt index ratios or different melt index values.

The following examples are given to illustrate the invention and should not be construed as to limiting its scope. All percentages are by weight and all parts are by molar or atomic ratio unless otherwise indicated.

In the following examples and comparative experiments, the melt index values $I_2$ and $I_{10}$ are determined by ASTM D 1238-86, condition "E" for $I_2$ and condition "N" for $I_{10}$, and the density values are determined by ASTM D 1248-84.

Preparation Of Anhydrous Magnesium Dichloride

To 21.16 ml of 0.709 molar dibutyl magnesium is added 78.84 ml of ISOPAR ™ E Anhydrous electronic grade HCl is passed through the solution until all of the magnesium alkyl is converted to magnesium chloride. Excess HCl is stripped from the slurry by purging with dry $N_2$. The resulting slurry (0.15 molar) of $MgCl_2$ in Isopar E is stored under a nitrogen atmosphere and utilized as a stock solution in the preparation of catalyst compositions. Prior to use, the portions of the stock solution is mixed with additional ISOPAR ™ E so as to obtain the desired molarity.

Preparation of Transition Metal Complexes

The following practices and procedures are common to all preparative examples:

All complexes are prepared under dry nitrogen which is passed through a column of reduced chromium on silica to remove the last traces of water and oxygen. Toluene is distilled from either Na or Na/K alloy under nitrogen. Hexane, diethyl ether and tetrahydrofuran are distilled from the Na/K benzophenone radical anion under nitrogen. All solvents are degassed prior to use. Manipulations are performed using standard Schlenk and vacuum line techniques. Amines and lithium alkyl reagents are purchased from Aldrich Chemical Co. and used without further purification or trap-to-trap distilled prior to use. Dimethylamine (anhydrous) is purchased from Matheson and used without further purification. Complexes are stored below −20° C. for liquids and room temperature for solids. Polymerization compositions are prepared in a Vacuum Atmospheres dry box equipped with a recirculating catalyst train packed with 13× molecular sieves and a deoxygenation catalyst such as those available from Vacuum Atmospheres.

EXAMPLE 1

A. Preparation of titanium tetrakis(dimethylamide).

Step (1) Preparation of lithium dimethylamide.

Dimethylamine is condensed into a 250 ml Schlenk flask at −20° C. over 4A Linde molecular sieves. The liquid is maintained at or below −10° C. to avoid vapor phase transition. A 1000 ml Schlenk is charged with 350 ml of diethyl ether and fitted with a pressure equalizing dropping funnel and magnetic stir bar. The contents are cooled in a dry ice/acetone bath and maintained at or below −20° C. for all additions. To the chilled diethyl ether in the 1000 ml flask is added n-butyllithium, 0.500 mole of a 2.90 molar solution in hexane. Diethyl ether, 150 ml, is added to the dropping funnel which is jacketed with dry ice to maintain a liquid temperature below −20° C. followed by excess dimethylamine, 35 ml (0.528 mole). The dimethylamine is slowly dripped into the 1000 ml Schlenk over the course of 1 hour. A suspension of white pyrophoric powder is obtained which is determined to be lithium dimethylamide. The mixture is warmed to room temperature for 1 hour to devolatilize excess dimethylamine.

Step (2) Preparation of titanium tetrakis(dimethylamide).

The same apparatus described in Step (1) is used in this procedure. The 250 ml pressure equalizing dropping funnel is charged with 100 ml of toluene and titanium tetrachloride. 12.4 ml (0.112 mole). The solution is added dropwise to the magnetically stirred suspension of lithium dimethylamide over the course of 0.5 hour at −20° C. A brown solution over insoluble lithium salts is obtained which is refluxed 2 hours. All volatiles are removed under vacuum at room temperature and the mixture is extracted twice with 200 ml portions of hexane. Solvent is distilled from the combined extracts giving a dark orange oil. Distillation of the oil (boiling point =60° C.–63° C. @0.025 mm Hg) gives the orange liquid titanium tetrakis(dimethylamide) in 90% yield.

B. Preparation of zirconium tetrakis(dimethylamide).

Step (1) Preparation of lithium dimethylamide.

The same method described in Example 1A is used to prepare lithium dimethylamide.

Step (2)Preparation of zirconium tetrakis(dimethylamide).

The lithium dimethylamide, 0.5 mole, in 250 ml of diethyl ether is chilled in an acetone/dry ice bath to −78° C. Zirconium tetrachloride, 26 g (0.112 mole), is transferred to a solid addition funnel attached to the 1000 ml Schlenk then added over 30 minutes to the magnetically stirred lithium dimethylamide slurry. The mixture is warmed slowly to room temperature then refluxed 1 hour. All volatiles are removed under vacuum at room temperature and the remaining oily solid is extracted twice with 150 ml portions of hexane. The combined extracts are reduced in solvent volume then transferred to a 50 ml flask. Solid zirconium tetrakis(dimethylamide) is distilled from the residue under reduced pressure (boiling point=40° C. to 60° C. @0 025 mm Hg) to give a white crystalline, low melting solid.

C. Preparation of hafnium tetrakis(dimethylamide).

Step (1) Preparation of lithium dimethylamide.

The same method described in Example 1A is used to prepare lithium dimethylamide.

Step (2) Preparation of hafnium tetrakis(dimethylamide).

The lithium dimethylamide, 0.5 mole, in 250 ml of diethyl ether is chilled in an acetone/dry ice bath to −78° C. Hafnium tetrachloride, 35.9 g (0.112 mole), is transferred to a solid addition funnel attached to the 500 ml Schlenk then added over 30 minutes to the magnetically stirred lithium dimethylamide slurry. The mixture is warmed slowly to room temperature then refluxed 1 hour. All volatiles are removed under vacuum at room temperature and the remaining oily solid is extracted twice with 150 ml portions of hexane. The combined extracts are reduced in solvent volume then transferred to a 50 ml flask. Solid hafnium tetrakis(dimethylamide) is distilled from the residue under reduced pressure (boiling point=55° C.–65° C. @ 0.025 mm Hg) to give a very low melting, waxy, white solid.

D. Preparation of titanium tetrakis(diethylamide).

Step (1) Preparation of lithium diethylamide.

To a 500 ml Schlenk is added 250 ml of diethylether which is chilled in an acetone/dry ice bath to −78° C. Next is added n-butyllithium, 0.300 mole of a 2.90 M solution in hexane, and the contents are allowed to warm to −20° C. Diethylamine, freshly distilled from calcium hydride, 35 ml (0.34 mole), is added via a 250 ml pressure equalizing dropping funnel over the course of 30 minutes while stirring the mixture at −20° C. The contents are warmed to room temperature for 1 hour.

Step (2) Preparation titanium tetrakis(diethylamide).

The same apparatus described in Step (1) of Example 1-D is used in this procedure. The 250 ml dropping funnel is charged with 50 ml of toluene and titanium tetrachloride, 7.7ml (75 millimole), and added to the solution of lithium diethylamide which is chilled to −78° C. over the course of 30 minutes. The mixture is warmed to room temperature then refluxed 2 hours. All volatiles are removed under vacuum and the residue is extracted twice with 100 ml portions of hexane. The combined extracts are reduced in solvent volume then transferred to a small scale distillation apparatus. The complex titanium tetrakis(diethylamide) is distilled from the mixture at 103° C.–105° C. (0.025 mm Hg) to give approximately 8 g as an orange liquid.

E. Preparation of titanium tetrakis(diphenylamide).

Step (1)Preparation of lithium diphenylamide.

To a 500 ml Schlenk equipped with a 250 ml pressure equalizing dropping funnel is added 250 ml of diethyl ether which is chilled to −78° C. in an acetone/dry ice bath. To this is added n-butyl lithium, 0.10 mole of a 2.90 molar solution in hexane, followed by the addition of 16.923 g (0.10 mole) of diphenylamine dissolved in ether, 50 ml. The flask contents are stirred magnetically and maintained at −78° C. during the addition of diphenylamine which requires 0.5 hour. The contents are warmed to room temperature for 2 hours.

Step (2) Preparation of titanium tetrakis(diphenylamide).

The same apparatus described in Step (1) of Example 1-E is used in this procedure. The 250 ml dropping funnel is charged with toluene, 50 ml, and titanium tetrachloride, 2.4 ml (0.022 mole). This is added dropwise to the flask containing lithium diphenylamide which is maintained at −20° C. during the addition while stirring magnetically. Total addition time is 30 minutes. The mixture is warmed to room temperature and then refluxed for 2 hours. All volatiles are removed under vacuum to give a deep red oily residue. Unreacted diphenylamine is sublimed from the oil under reduced pressure at 120° C. to give a red solid: Extraction of the solid with hexane, 50 ml, followed by solvent volume reduction under vacuum then cooling to −30° C. yields red crystals of titanium tetrakis(diphenylamide).

F. Preparation of titanium tetrakis(dipropylamide).

Step (1)Preparation of lithium dipropylamide.

A one liter Schlenk flask equipped with a 250 ml pressure equalizing dropping funnel and magnetic stir bar is charged with 500 ml of diethylether. The contents are chilled to −78° C. in an acetone/dry ice bath and n-butyllithium, 0.250 mole of a 2.81 molar solution in hexane is next added. A solution containing dipropylamine, 38 ml, dissolved in 150 ml of ether is added dropwise to the n-butyllithium solution while the contents are stirred magnetically and allowed to slowly warm to room temperature. The contents are stirred overnight at room temperature to insure complete reaction.

Step (2)Preparation of titanium tetrakis(dipropylamide).

The same apparatus described in Step (1) of Example 1-F is used in this procedure. The 250 ml dropping funnel is charged with toluene, 100 ml, and titanium tetrachloride, 10.7 g (0.0562 mole). This is added dropwise to the flask containing lithium dipropylamide while stirring magnetically. Total addition times are typically 30 minutes. The mixture is then refluxed for 1.5 hours. All volatiles are removed by distillation and under vacuum to give a deeply colored brown, oily residue. The residue is extracted with hexane, 2×150 ml, and the extracts are combined and solvent removed under vacuum. The remaining oil is transferred to a small scale distillation apparatus. Vacuum distillation at 157° C. and 0.05 mm Hg gave the product as an orange-brown liquid, titanium tetrakis(dipropylamide).

G. Preparation of bis(diethylamide)titanium bis(dimethylamide).

Step (1) Preparation of dichlorotitanium bis(dimethylamide).

The complex is prepared by the disproportionation reaction of titanium tetrakis(dimethylamide) with titanium tetrachloride in toluene. In a 250 ml Schlenk containing 75ml of toluene is added, 0.43 ml (3.88 millimole) of titanium tetrachloride and 0.95 g (3.88 mmole) of titanium tetrakis(dimethylamide). The mixture is refluxed one hour to give a brown solution. All volatiles are removed under vacuum and the deep brown powder is washed twice with 25 ml portions of hexane followed by vacuum drying of the powder. The complex is transferred to a 500 ml Schlenk for the reaction described in Step (3) of Example 1-F.

Step (2) Preparation of lithium diethylamide.

The complex is prepared as previously described in Step (1) of Example 1-D on a 12.25 mmole scale for subsequent reaction with dichlorotitanium bis(dimethylamide).

Step (3) Preparation of bis(diethylamide) titanium bis(dimethylamide).

Dichlorotitanium bis(dimethylamide) is dissolved in 100 ml of diethyl ether then cooled in an acetone/dry icebath to −20° C. Lithium diethylamide, 12.25 mmole, is added dropwise via a pressure equalizing dropping funnel to the magnetically stirred mixture over 30 minutes. The mixture is slowly warmed to room temperature then refluxed 2 hours. All volatiles are removed under vacuum to give an orange-brown oil over lithium salts. The oil is extracted with hexane (3 X 20 ml) and the combined extracts are transferred for distillation apparatus and the solvent is removed under vacuum. Distillation of the residue at 82° C. to 86° C. (0.025 mm Hg) gives the orange liquid bis(diethylamide)titanium bis(dimethylamide).

EXAMPLE 2 CATALYST PREPARATION AND ACTIVATION

A. Preparation of Catalyst Premix Compositions.

The catalyst is prepared by adding with stirring to a septum capped bottle of sufficient volume to contain the mixture the following components in the order listed. In this and all subsequent examples unless otherwise indicated, the cocatalyst or activator is not added until just prior to addition to the polymerization reactor. The catalyst premix is defined as the composition containing components A, D, B and C or D, A, B and C. Component (A) is the inorganic support, component (B) is the reducing halide, component (C) is the transition metal compound or complex and component (D) is an inert diluent or solvent. This is indefinitely stable prior to activation with Mc (cocatalyst). The components are added in the order listed.

1. Titanium Tetrakis(dimethylamide) premix
   (A) 279.2 ml MsCl$_2$, 0.1816 M in Ms (support, Ms=Mg)
   (D) 11 ml ISOPAR ™ E (diluent)
   (B) 7.72 g 25 wt.% ethylaluminum dichloride (reducing agent, Mr=Al)
   (C) 0.853 g Ti(N(CH$_3$)$_2$)$_4$ (where Tm=Ti)
   Components A, D and B are aged at least 24 hours. Components A, D, B and C are aged at least 48 hours prior to adding Mc (cocatalyst). Calculated Mg/Tm/Al ratio (where Tm=Ti)=40/3/12.

2. Titanium Tetrakis(dimethylamide) premix
   (A) 139.6 ml MsCl$_2$, 0.1816 M in Ms (support, Ms=Mg)
   (D) 2.8 ml ISOPAR ™ E (diluent)
   (B) 5.793 g 25 wt.% ethylaluminum dichloride (reducing agent, Mr=Al)
   (C) 0.426 g Ti(N(CH$_3$)$_2$)$_4$ (where Tm=Ti) Components A, D and B are aged at least 24 hours. Components A, D, B and D are aged at least 48 hours prior to adding Mc (cocatalyst). Calculated Mg/Tm/Al ratio (where Tm=Ti)=40/3/18.

3. Titanium Tetrakis(diethylamide) premix
   (A) 139.6 ml MsCl? , 0.1816 M in Ms (support, Ms=Mg)
   (D) 0 ml ISOPAR ™ E (diluent)
   (B) 7.724 g 25 wt.% ethylaluminum dichloride (reducing agent, Mr=Al)
   (C) 0 640 g Ti(N(CH$_3$)$_2$)$_4$ (where Tm=Ti)
   Components A, B and C are aged at least 24 hours. Components A, B, C and D are aged at least 48 hours prior to adding Mc (cocatalyst). Calculated Mg/Tm/Al ratio (where Tm=Ti)=40/3/24.

4. Titanium Tetrakis(dipropylamide) premix
   (A) 186.1 ml MsCl$_2$, 0.1816 M in Ms (support, Ms=Mg)
   (D) 0 ml ISOPAR ™ E
   (B) 10.298 g 25 wt.% ethylaluminum dichloride (reducing agent, Mr=Al)
   (C) 1.016 g Ti(N(CH$_3$)$_2$)$_4$ Components A, B and C are aged at least 24 hours. Components A, B, C and D are aged at least 48 hours prior to adding Mc (cocatalyst). Calculated Mg/Tm/Al ratio (where Tm=Ti)=40/3/24.

5. Titanium Tetrakis(diphenylamide) premix
   (A) 45.6 ml MsCl$_2$, 0.1816 M in Ms (support, Ms=Mg)
   (D) 0 ml ISOPAR ™ E
   (B) 3.627 g 26.6 wt.% ethylaluminum dichloride (reducing agent)
   (C) 0.457 g Ti(N(CH$_3$)$_2$)$_4$ 6. Titanium Tetrakis(dimethylamide) premix
   (A and B)$_{48.8}$ ml MsCl? /ethylaluminum dichloride stock solution* (Ms=Mg)
   (D) 1.2 ml ISOPAR ™ E
   (C) 0.142 g Ti(N(CH$_3$)$_2$)$_4$ Components A, D and C are aged at least 48 hours prior to adding Mc (cocatalyst). Calculated Mg/Tm/Al ratio (where Tm=Ti)=40/3/18.
   *Stock solution=186.1 ml of 0.182 M MgCl$_2$ (component A)+7.259 g of 26.6% ethylaluminum dichloride (component B), components are aged at least 24 hours.

7. Zirconium Tetrakis(dimethylamide) premix
   (A and B)48.8 ml MsCl$_2$/ethylaluminum dichloride stock solution* (Ms=Mg)
   (D) 1.2 ml ISOPAR ™ E
   (C) 0.170 g Zr(N(CH$_3$)$_2$)$_4$ Components A, D and C are aged at least 48 hours prior to adding Mc (cocatalyst). Calculated Mg/Tm/Al ratio (where Tm=Ti)=40/3/18.

8. Hafnium Tetrakis(dimethylamide) premix
   (A and B)48.8 ml MsCl$_2$/ethylaluminum dichloride stock solution* (Ms=Mg)
   (D) 1.2 ml ISOPAR ™ E
   (C) 0.225 g Hf(N(CH$_3$)$_2$)$_4$ Components A, D and C are aged at least 48 hours prior to adding Mc. Calculated Mg/Tm/Al ratio (where Tm=Ti)=40/3/18.
   *Stock solution=186.1 ml of 0.182 M MgCl$_2$ (component A)+7.259 g of 26.6% ethylaluminum dichloride (component B), components are aged at least 24 hours.

9. Bis(diethylamide) Titanium Bis(dimethylamide) premix
   (D) 1.1 ml ISOPAR ™ E
   (A) 46.5 ml MsCl$_2$ 0.1816 M in Ms (Ms=Mg)
   (B) 1.815 g 26.6 wt.% ethylaluminum dichloride (reducing agent)
   (C) 0.178 g Ti(N(CH$_3$)$_2$)$_2$(N(C$_2$H$_5$)$_2$)$_2$ Components D, A and B are aged at least 24 hours prior to adding C. Components D, A, B and C are aged at least 24 hours prior to activation with Mc cocatalyst). Calculated Mg/Tm/Al ratio (where Tm=Ti)=40/3/18.

B. Preparation and Activation of Catalyst Compositions

The catalyst is activated by adding under nitrogen to a 4-ounce serum bottle the following components in any order with the exception of Mc (cocatalyst or activator) which is added last. The cocatalyst or activator is added just prior to addition to the polymerization reactor.

1. Single Transition Metal Component Catalysts
   (D) 44.9 ml ISOPAR ™ E (diluent)
   (E) 3.6 ml premix catalyst (Examples A1-A8)
   (F) 1.5 ml 0.12 M triethylaluminum (MC=Al)
   The final ratio for Tm/Mc=3/12 (where Tm=Ti, Zr, Hf and Mc=Al of triethylaluminum).

2. Mixed Transition Metal Component Catalysts
   (D) 45.2 ISOPAR ™ E
   (C1) (3.6)x ml titanium tetrakis(dimethylamide) (Example 2A6)
   (C2) (3.6)y ml zirconium tetrakis(dimethylamide) (Example 2A7)
   (C3) (3.6)z ml hafnium tetrakis(dimethylamide) (Example 2A8)
   (F) 1.2 ml 0.12 M triethylaluminum (Mc=Al)

The final ratio for Tm/Mc=3/9.6 (where Tm=the sum of Ti/Zr/Hf for a composition containing a Mg/Tm ratio of 40/3 and Mc=Al of triethylaluminum). X, y and z are the normalized Tm ratios where x+y+z=1. All activated catalyst compositions are prepared to give a final Tm concentration of approximately 0.9 μmole/ml.

EXAMPLE 3 POLYMERIZATION

Following is the method employed for the polymerization reaction is used in all examples described in Table I. A stirred, one gallon (3.79 liter) batch reactor containing two liters of ISOPAR ™ E and optionally a comonomer is heated to the desired polymerization temperature and the solvent vapor pressure recorded. To this an amount of hydrogen is optionally added which is recorded as the differential pressure drop from a 75 ml pressurized tank. The reactor is pressurized with ethylene to give the final desired reactor pressure which is approximately 450 psi (3.10 MPa). An amount of catalyst adjusted to produce a maximum ethylene consumption of approximately 120 g as measured by a mass flow meter over a 10 minute (600 s) reaction time is injected into the reactor. Ethylene reactor pressure is maintained at a constant level by a demand feed regulator to replace the ethylene consumed by the polymerization reaction. The total reaction time is 10 minutes (600 s). The results are given in Table I.

TABLE I

| RUN NO. | TRANSITION METAL SOURCE | R GROUP IN Tm(NR$_2$)$_4$ | CATALYST PREPARATION AND ACTIVATION | COMONOMER type | COMONOMER Volume, ml | REACTOR TEMP. °C. | HYDROGEN DELTA psi |
|---|---|---|---|---|---|---|---|
| A | Ex. 1-A | methyl | Ex. 2-A1-B1 | Hexene | 345 | 185 | 100 |
| B | Ex. 1-A | methyl | Ex. 2-A1-B1 | Decene | 345 | 185 | 100 |
| C | Ex. 1-A | methyl | Ex. 2-A1-B1 | 4-Methylpentene | 345 | 185 | 100 |
| D | Ex. 1-A | methyl | Ex. 2-A1-B1 | Octene | 345 | 185 | 100 |
| E | Ex. 1-A | methyl | Ex. 2-A2-B1 | Octene | 345 | 185 | 100 |
| F | Ex. 1-A | methyl | Ex. 2-A2-B1 | Octene | 535 | 185 | 50 |
| G | Ex. 1-A | methyl | Ex. 2-A2-B1 | Octene | 345 | 175 | 150 |
| H | Ex. 1-D | ethyl | Ex. 2-A3-B1 | Octene | 345 | 185 | 100 |

TABLE I-continued

| | | | | | | | |
|---|---|---|---|---|---|---|---|
| I | Ex. 1-F | propyl | Ex. 2-A4-B1 | Octene | 345 | 185 | 100 |
| J | Ex. 1-E | phenyl | Ex. 2-A5-B1 | Octene | 345 | 185 | 100 |
| K | Ex. 1-E | phenyl | Ex. 2-A5-B1 | Octene | 345 | 185 | 0 |
| L* | Ex. 1-B | methyl | Ex. 2-A7-B2 | Octene | 345 | 185 | 100 |
| M | Ex. 1-A,B | methyl | Ex. 2-A6, 7-B2 | Octene | 345 | 185 | 100 |
| N | Ex. 1-A,B | methyl | Ex. 2-A6, 7-B2 | Octene | 345 | 185 | 100 |
| O* | Ex. 1-C | methyl | Wx. 2-A8-B2 | Octene | 345 | 185 | 100 |
| P | Ex. 1-A,C | methyl | Ex. 2-A6, 8-B2 | Octene | 345 | 185 | 100 |
| Q | Ex. 1-A,C | methyl | Ex. 2-A6, 8-B2 | Octene | 345 | 185 | 100 |
| R | Ex. 1-A,B,C | methyl | Ex. 2-A6,7,8-B2 | Octene | 345 | 185 | 100 |
| S | Ex. 1-A | methyl | Ex. 2-A6-B2 | Octene | 345 | 225 | 100 |
| T | Ex. 1-A | methyl | Ex. 2-A6-B2 | Octene | 345 | 150 | 100 |
| U | Ex. 1-A | methyl | Ex. 2-A6-B2 | Octene | 0 | 185 | 100 |
| V | Ex. 1-G | methyl/ethyl | Ex. 2-A9-B1 | Octene | 790 | 185 | 100 |

| RUN NO. | EFFICIENCY IN kg-PE/g Tm | ATOMIC RATIO Ms/Tm/Mr/Mc | ATOMIC RATIO Ti/Zr/Hf | $\mu$MOLES Tm IN REACTOR | $I_2$ | $I_{10}/I_2$ | DENSITY |
|---|---|---|---|---|---|---|---|
| A | 175 | 40/3/12/12 | 3/0/0 | 12.3 | 1.56 | 7.31 | 0.9233 |
| B | 202 | 40/3/12/12 | 3/0/0 | 12.8 | 1.01 | 7.44 | 0.9293 |
| C | 161 | 40/3/12/12 | 3/0/0 | 14.6 | 1.59 | 7.54 | 0.9284 |
| D | 239 | 40/3/12/12 | 3/0/0 | 10.9 | 1.25 | 7.47 | 0.9247 |
| E | 368 | 40/3/18/12 | 3/0/0 | 14.0 | 1.52 | 7.07 | 0.9254 |
| F | 398 | 40/3/18/12 | 3/0/0 | 16.0 | 0.90 | 7.88 | 0.9186 |
| G | 840 | 40/3/18/12 | 3/0/0 | 8.0 | 1.63 | 7.07 | 0.9229 |
| H | 505 | 40/3/24/12 | 3/0/0 | 5.47 | 1.24 | 7.60 | 0.9210 |
| I | 304 | 40/3/24/12 | 3/0/0 | 8.4 | 1.38 | 7.25 | 0.9247 |
| J | 57 | 40/3/36/12 | 3/0/0 | 9.0 | 1.08 | 7.39 | 0.9282 |
| K | 47 | 40/3/36/12 | 3/0/0 | 18.0 | 0.82 | 7.84 | 0.9288 |
| L* | 18 | 40/3/18/9.5 | 0/3/0 | 9.0 | 0.95 | 7.45 | N.D. |
| M | 306 | 40/3/18/9.5 | 2.7/.3/0 | 9.0 | 1.29 | 7.40 | 0.9251 |
| N | 47 | 40/3/18/9.5 | .3/2.7/0 | 9.0 | 1.64 | 7.68 | 0.9244 |
| O* | 5 | 40/3/18/9.5 | 0/0/3 | 9.0 | 1.04 | 7.90 | N.D. |
| P | 230 | 40/3/18/9.5 | 2.7/0/.3 | 9.0 | 1.36 | 7.59 | 0.9242 |
| Q | 28 | 40/3/18/9.5 | .3/0/2.7 | 9.0 | 1.67 | 8.28 | 0.9214 |
| R | 67 | 40/3/18/9.5 | 1/1/1 | 9.0 | 1.91 | 7.47 | 0.9220 |
| S | 50 | 40/3/18/9.5 | 3/0/0 | 9.0 | 28.52 | 7.57 | 0.9254 |
| T | 799 | 40/3/18/9.5 | 3/0/0 | 9.0 | 0.31 | 7.67 | 0.9222 |
| U | 346 | 40/3/18/9.5 | 3/0/0 | 9.0 | 0.60 | 7.15 | 0.9590 |
| V | 260 | 40/3/18/12 | 3/0/0 | 9.0 | 2.60 | 7.61 | 0.9185 |

\* = not an example of the current invention
N.D. = not determined due to insufficient sample size

EXAMPLE 4

A. Preparation of Catalyst

The following components are blended and added in the order listed.
1. 1.1 cc of ISOPAR TM E diluent
2. 46.5 cc of 0.1816 M MgCl$_2$ support
3. 0.192 g of (25 wt.% Al solution) of Ethyl aluminum dichloride (EADC) reducing agent
4. 0.142 g of Ti(NR$_2$)$_4$ where R=methyl
5. 1.5 cc of 0.12 M triethylaluminum (cocatalyst or activator)

The atomic ratio of Mg/Ti/Al is 40/3/12 where the amount of aluminum does not include that contributed by the cocatalyst. The mixture containing the MgCl$_2$ and EADC is aged 24 hours prior to adding the Ti(NR$_2$)$_4$. The catalyst is aged 24 hours after adding the Ti(NR$_2$)$_4$ before mixing with the cocatalyst.

B. Polymerization

The polymerization is conducted as described in Example 3. The amount of octene employed is 300 ml, the amount of hydrogen is that which produces a $\Delta$P of 100 psi (689.48 kPa) in a 75 ml pressure vessel. The polymerization is conducted at a temperature of 185° C.

The results of the polymerization is given in Table II.

COMPARATIVE EXPERIMENT A

A. Preparation of Catalyst

The following components are blended and added in the order listed.
1. 1.1 cc of ISOPAR TM E diluent
2. 46.5 cc of 0.1816 M MgCl$_2$ support
3. 0.142 g of Ti(NR$_2$)$_4$ where R=methyl
4. 0.192 g of (25 wt.% Al solution) of Ethyl aluminum dichloride (EADC) reducing agent
5. 1.5 cc of 0.12 M triethylaluminum (cocatalyst or activator)

The atomic ratio of Mg/Ti/Al is 40/3/12 where the amount of aluminum does not include the cocatalyst. The mixture containing the MgCl$_2$ and Ti(NR$_2$)$_4$ is aged 24 hours prior to adding the EADC . The catalyst is aged hours after adding the EADC before mixing with the cocatalyst.

B Polymerization

The polymerization is conducted in the same manner as in Example 4.

The results of the polymerization are given in Table II.

TABLE II

| Run No. | Catalyst Employed | Efficiency gP/gTi |
|---|---|---|
| 1[a] | Ex. 4 | 227,000 |
| 2*,[a] | Comp. Expt. A | 172,000 |
| 3[b] | Ex. 4 | 260,000 |
| 4*,[b] | Comp. Expt. A | 192,000 |

*Not an example of the present invention.
[a]The polymerization is conducted 24 hours after mixing of the catalyst with the cocatalyst.
[b]The polymerization is conducted 48 hours after mixing of the catalyst with the cocatalyst.

What is claimed is:

1. A supported catalyst which comprises the product resulting from mixing in a suitable inert diluent or solvent
   (A) an inorganic support;
   (B) a metal-containing reducing agent;
   (C) a transition metal compound selected from the group consisting of a titanium tetrakis(dialkylamide) or titanium tetrakis(diarylamide) or a combination thereof; wherein in the preparation of the catalyst, all of components (A) and (B) are added prior to the addition of component (C) and the components are employed in quantities which provide an atomic ratio of Ms:Tm of from about 2:1 to about 160:1: an atomic ratio of Mr:Tm of from about 1:1 to about 64:1; and wherein Ms represents the metal atoms in the support material, Mr represents the metal atoms in the reducing agent and Tm represents the sum of the transition metal atoms in the transition metal component.

2. A supported catalyst of claim 1 wherein the components are employed in quantities which provide an atomic ratio of Ms:Tm of from about 8:1 to about 80:1 and an atomic ratio of Mr:Tm of from about 2:1 to about 32:1.

3. A supported catalyst of claim 2 wherein the components are employed in quantities which provide an atomic ratio of Ms:Tm of from about 11:1 to about 40:1 and an atomic ratio of Mr:Tm of from about 4:1 to about 16:1

4. A supported catalyst of claim 1, 2, or 3 wherein
   (a) component (A) is a magnesium dihalide:
   (b) component (B) is a compound represented by the formulas $Al(R')_{3-m}X_m$ and $B(R')_{3-m}X_m$ wherein each R' is independently hydrogen or a hydrocarbyl group having from 1 to about 20 carbon atoms; X is a halogen; and m has a value of 1 to 2;
   (c) component (C) is a compound represented by the formula $Ti(NR_2)_4$ wherein each R is independently an alkyl group having from 1 to about 4 carbon atoms, a benzyl group, an alkyl substituted benzyl group wherein each alkyl group has from 1 to about 4 carbon atoms, a phenyl group, or an alkyl substituted aryl group having from about 7 to 20 carbon atoms, wherein the alkyl groups have from 1 to about 4 carbon atoms.

5. A supported catalyst of claim 4 wherein
   (a) component (A) is magnesium dichloride;
   (b) component (B) is ethylaluminum dichloride, diethylaluminum chloride, ethylaluminum sesquichloride, triethylboron, diethylboron chloride, diethylaluminum bromide, ethylaluminum dibromide, triethylaluminum, trimethylaluminum, triisobutylaluminum, lithium aluminum hydride, potassium hydride, sodium hydride, methyllithium or butyllithium or any combination thereof; and
   (c) component (C) is titanium tetrakis(dimethylamide, titanium tetrakis(diethylamide), titanium tetrakis(di-i-propylamide), titanium tetrakis(di-n-propylamide), titanium tetrakis(di-i-butylamide), titanium tetrakis(di-n-butylamide), titanium tetrakis(diphenylamide), titanium tetrakis(dibenzylamide), titanium bis(diethylamide) bis(dimethylamide) or i-propylamide titanium tris(dimethylamide), or any combination thereof.

6. A supported catalyst of claim 1, 2 or 3 wherein the transition metal component (C) additionally contains at least one zirconium or hafnium compound selected from a zirconium tetrakis(dialkylamide), a zirconium tetrakis(diarylamide), a hafnium tetrakis(dialkylamide), a hafnium tetrakis(diarylamide), or any combination thereof; wherein the atomic ratio of (Zr+Hf) to (Ti+Zr+Hf) is from about <0:1 to about 0.9:1.

7. A supported catalyst of claim 6 wherein
   (a) the zirconium compound is represented by the formula $Zr(NR_2)_4$ wherein each R is independently an alkyl group having from 1 to about 4 carbon atoms, a benzyl group, an alkyl substituted benzyl group wherein each alkyl group has from 1 to about 4 carbon atoms, a phenyl group, or an alkyl substituted aryl group having from about 7 to 20 carbon atoms, wherein the alkyl groups have from 1 to about 4 carbon atoms;
   (b) the hafnium compound is represented by the formula $Hf(NR_2)_4$ wherein each R is independently an alkyl group having from 1 to about 4 carbon atoms, a benzyl group, an alkyl substituted benzyl group wherein each alkyl group has from 1 to about 4 carbon atoms, a phenyl group, or an alkyl substituted aryl group having from about 7 to 20 carbon atoms, wherein the alkyl groups have from 1 to about 4 carbon atoms; and
   (c) the atomic ratio of (Zr+Hf) to (Ti+Zr+Hf) is from about <0:1 to about 0.8:1.

8. A supported catalyst of claim 7 wherein
   (a) the zirconium compound is zirconium tetrakis(dimethylamide), zirconium tetrakis(diethylamide), zirconium tetrakis(di-i-propylamide), zirconium tetrakis(di-n-propylamide), zirconium tetrakis(di-i-butylamide), zirconium tetrakis(di-n-butylamide), zirconium tetrakis(diphenylamide), zirconium bis(diethylamide) bis(dimethylamide) or i-propylamide zirconium tris(dimethylamide), or any combination thereof;
   (b) the hafnium compound is hafnium tetrakis(dimethylamide), hafnium tetrakis(diethylamide), hafnium tetrakis(di-i-propylamide), hafnium tetrakis(di-n-propylamide), hafnium tetrakis(di-i-butylamide), hafnium tetrakis(di-n-butylamide), hafnium tetrakis(diphenylamide), hafnium tetrakis(dibenzylamide), hafnium bis(diethylamide) bis(dimethylamide) or i-propylamide hafnium tris(dimethylamide), or any combination thereof; and
   (c) the atomic ratio of (Zr+Hf) to (Ti+Zr+Hf) is from about <0:1 to about 0.7:1.

* * * * *

UNITED STATES PATENT AND TRADEMARK OFFICE
CERTIFICATE OF CORRECTION

PATENT NO. : 4,956,323                              Page 1 of 4

DATED : Sep. 11, 1990

INVENTOR(S) : John G. Hefner

It is certified that error appears in the above-identified patent and that said Letters Patent is hereby corrected as shown below:

Abstract: line 17; change "tetrakis (dialkylaminde or diarylamide)" to read--tetrakis (dialkylamide or diarylamide--.

Col. 1, line 57; change "(B) a metal-containing reducing agent: " to read--(B)a metal-containing reducing agent;--.

Col. 1, line 61; change "thereof: wherein" to read--thereof; wherein--.

Col. 2, line 16; change "(A) an inorganic support: " to read--(A) an inorganic support; --.

Col. 2, line 23; change "addition of component (C): and " to read--addition of component (C); and--.

Col. 1, line 61; change "thereof: wherein in" to read--thereof; wherein in--.

Col. 9, line 67; change "40°C. to 60°C. @ 0 025 mm Hg)" to read--40°C. to 60°C. @ 0.025 mm Hg)--.

Col. 11, line 9; change "give a red solid: Extraction of the" to read--give a red solid. Extraction of the--.

Col. 12, line 37; change "MsCl$_2$, 0.1816 M in Ms (support, " to read--MsCl$_2$, 0.1816 $\underline{M}$ in Ms (support--.

Col. 12, line 48; change "MsCl$_2$, 0.1816 M in Ms (support, " to read--MsCl$_2$, 0.1816 $\underline{M}$ in Ms (support--.

UNITED STATES PATENT AND TRADEMARK OFFICE
CERTIFICATE OF CORRECTION

PATENT NO. : 4,956,323

DATED : Sep. 11, 1990

INVENTOR(S) : John G. Hefner

It is certified that error appears in the above-identified patent and that said Letters Patent is hereby corrected as shown below:

Col. 12, line 59; change "139.6 ml MsCl$_2$, 0.1816 M in Ms (support," to read--139.61 ml MsCl$_2$, 0.1816 $\underline{M}$ in Ms (support,--.

Col. 12, line 59; change "0.1816 M in Ms (support," to read--0.1816 $\underline{M}$ in Ms (support,--.

Col. 12, line 64; change "(c) 0 640g Ti(N(CH$_3$)$_2$)$_4$" to read--(c) 0.640g Ti(N(CH$_3$)$_2$)$_4$--.

Col. 13, line 2; change "0.1816 M in Ms (support," to read--0.1816 $\underline{M}$ in Ms (support,--.

Col. 13, line 13; change "0.1816 M in Ms (support," to read--0.1816 $\underline{M}$ in Ms (support,--.

Col. 13, line 20; change "ml MsCl$_2$/ethylaluminum" to read--ml MsCl$_2$/ethylaluminum--.

Col. 13, line 27; change "ml of 0.182M MgCl$_2$" to read--ml of 0.182$\underline{M}$ MgCl$_2$--.

Col. 13, line 37; insert--*stock solution - 186.1 ml MgCl$_2$ (component A) +7.259 g of 26.6% ethylaluminum dichloride (component B), components are aged at least 24 hours.--

Col. 13, line 45; change "ml of 0.182M MgCl$_2$" to read--ml of 0.182$\underline{M}$ MgCl$_2$--.

UNITED STATES PATENT AND TRADEMARK OFFICE
CERTIFICATE OF CORRECTION

PATENT NO. : 4,956,323

DATED : Sep. 11, 1990

INVENTOR(S) : John G. Hefner

It is certified that error appears in the above-identified patent and that said Letters Patent is hereby corrected as shown below:

Col. 13, line 50; change "MsCl$_2$ 0.1816M in Ms "to read--MsCl$_2$ 0.1816$\underline{M}$ in Ms--.

Col. 14, line 16; change "(F) 1.5 ml 0.12 M triethylaluminum" to read--(F) 1.5 ml 0.12 $\underline{M}$ triethylaluminum--.

Col. 14, line 27; change "(F) 1.2 ml 0.12 M triethylaluminum" to read--(F) 1.2 ml 0.12 $\underline{M}$ triethylaluminum Col. 15-16 table, line 9; change "wx. 2-A8-B2" to read--Ex. 2-A8-B2--.

Col. 16, line 50; change "1.1 cc of ISOPAR" to read--1. 1.1 cc of ISOPAR--.

Column 16, line 61 "aged hours" should read --aged 24 hours--.

Col. 17, line 28; change "about 160:1: an" to read--about 160:1; an--.

Col. 17, line 45; change "(A) is a magnesium dihalide:" to read--(A) is a magnesium dihalide;--.

Col. 18, line 22; change "is from about <0:1 to about" to read--is from about >0:1 to about--.

Col. 18, line 43; change "from about <0.1 to about" to read--from about >0:1 to about--.

UNITED STATES PATENT AND TRADEMARK OFFICE
CERTIFICATE OF CORRECTION

PATENT NO. : 4,956,323

DATED : September 11, 1990

INVENTOR(S) : John G. Hefner

It is certified that error appears in the above-identified patent and that said Letters Patent is hereby corrected as shown below:

Col. 18, line 64; change "from about <0.1 to about" to read --from about >0:1 to about--..

Signed and Sealed this

Twenty-seventh Day of October, 1992

Attest:

DOUGLAS B. COMER

Attesting Officer     Acting Commissioner of Patents and Trademarks